United States Patent
Palmer et al.

(10) Patent No.: US 10,637,584 B1
(45) Date of Patent: Apr. 28, 2020

(54) OPTICAL TRANSCEIVER WITH INTEGRATED OPTICAL LOOPBACK

(71) Applicant: Elenion Technologies, LLC, New York, NY (US)

(72) Inventors: Robert Palmer, Munich (DE); Torsten Wuth-Brüning, Munich (DE); Ruizhi Shi, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/288,397

(22) Filed: Feb. 28, 2019

(51) Int. Cl.
| | |
|---|---|
| *H04B 10/00* | (2013.01) |
| *H04B 10/70* | (2013.01) |
| *H04Q 11/00* | (2006.01) |
| *H04B 10/40* | (2013.01) |
| *H04B 10/079* | (2013.01) |
| *H04J 14/00* | (2006.01) |

(52) U.S. Cl.
CPC ........... *H04B 10/70* (2013.01); *H04B 10/079* (2013.01); *H04B 10/40* (2013.01); *H04Q 11/0005* (2013.01); *H04Q 11/0062* (2013.01); *H04Q 2011/0039* (2013.01); *H04Q 2011/0083* (2013.01)

(58) Field of Classification Search
CPC ................................ H04B 10/40; H04B 10/43
See application file for complete search history.

(56) References Cited

U.S. PATENT DOCUMENTS

| | | | |
|---|---|---|---|
| 7,477,847 B2 | 1/2009 | Hofmeister | |
| 7,881,616 B2 | 2/2011 | Hahin | |
| 8,583,395 B2 | 11/2013 | Dybsetter | |
| 8,938,166 B2 | 1/2015 | Roullot | |
| 9,118,601 B2 | 8/2015 | Chouinard | |
| 9,485,026 B2 | 11/2016 | Park | |
| 2015/0222968 A1* | 8/2015 | Garcia | H04B 10/0799 398/48 |
| 2017/0195055 A1* | 7/2017 | Evans | H01S 5/02453 |
| 2017/0366880 A1 | 12/2017 | Garcia | |
| 2018/0343062 A1 | 11/2018 | Voois | |

* cited by examiner

*Primary Examiner* — Daniel G Dobson
(74) *Attorney, Agent, or Firm* — Stratford Managers Corporation (57) ABSTRACT

A photonic integrated circuit for an optical transceiver includes an optical Rx circuit, an optical Tx circuit, and an integrated optical loopback circuit configured to switchably direct a loopback optical signal from an output of the optical Tx circuit to an input of the optical Rx circuit. The integrated optical loopback circuit enables in-field testing of the optical transceiver. The integrated optical loopback circuit may include an optical mixer for mixing polarization channels in dual-polarization embodiments of the optical transceiver. A phase tuner may be provided for tuning the optical phase of local oscillator light for mixing I and Q channels of the loopback optical signals in embodiments operating with quadrature modulated signals.

18 Claims, 7 Drawing Sheets

OPTICAL TRANSCEIVER WITH INTEGRATED OPTICAL LOOPBACK

TECHNICAL FIELD

The present invention generally relates to optical communication systems and components thereof, and more particularly relates to an integrated optical transceiver.

BACKGROUND

Broad-band optical communications typically require high data rate optoelectronic transceivers incorporating an optical receiver capable of converting high data rate signals from optical to electrical domain and an optical transmitter capable of converting high data rate signals from electrical to optical domain. An optoelectronic transceiver may include an optical transmitter (Tx) circuit and an optical receiver (Rx) circuit, which may be implemented with one or more photonic chips, which may be mounted on a circuit board with driver and signal processing electronics. An optical Tx circuit may include an electro-optic (EO) converter, typically an optical modulator such as a waveguide Mach Zehnder modulator (MZM) for devices operating in the GHz frequency range and beyond. An optical Rx circuit may include one or more optical couplers and/or optical mixers and may further include one or more opto-electric (OE) converters, such as one or more photodetectors, for example in the form of PIN photodiodes.

High-data-rate optoelectronic transceiver modules may require device-specific precise optimization of various parameters of the transmitter and the receiver. These parameters may include, for example, skew-compensation values of the RF channels of the transmitter and of the receiver, filter settings for digital pre-compensation of bandwidth limitations of the hardware, and/or channel power level adjustment, e.g. for squareness correction of quadrature amplitude modulated signals, and alike. In particular higher-order modulation formats, for example 16QAM and 64QAM, and high symbol rates, for example 60 GBaud, require highly optimized transceiver settings, such as precise skew compensation values. However, module settings that are found during factory calibration under laboratory conditions may not match optimal settings in the field. The need for module calibration in the field further increases with the rise of new transceiver platforms that separate the digital electrical data processing unit from an analogue electro-optic conversion engine. For example CFP2-ACO hot-pluggable optical transceiver modules may be hosted in the field on printed circuit boards (PCB) that are sourced separately from the pluggables. Consequently, the digital host unit and the analogue pluggable optical transceiver are calibrated in their respective factory independently, and their optimal settings may not match. However calibration of conventional transceiver modules typically requires on-site technical personal and thus may be too costly to perform in the field.

SUMMARY

An aspect of the present disclosure relates to an optical transceiver comprising a photonic transceiver chip with an integrated optical loopback.

An aspect of the present disclosure relates to a photonic integrated circuit (PIC) for an optical transceiver, the PIC comprising: an input PIC port for receiving an input optical signal; an output PIC port for transmitting an output optical signal; an optical receiver (Rx) circuit optically coupled to the input PIC port and configured to process the input optical signal for conversion into one or more electrical Rx signals; an optical transmitter (Tx) circuit optically coupled to the output PIC port, the optical Tx circuit configured to provide the output optical signal and a loopback optical signal responsive to one or more electrical Tx signals; and, a loopback optical circuit (LOC) configured to switchably couple the loopback optical signal into the optical Rx circuit for testing and/or tuning one or more parameters of the optical transceiver.

An aspect of the present disclosure relates to a method for characterizing an optoelectronic transceiver comprising a PIC, the PIC comprising an optical Rx circuit and an optical Tx circuit, the method comprising: switchably directing, within the PIC, a loopback optical signal from an output port of the optical Tx circuit to an input port of the optical Rx circuit; and, processing one or more electrical signals obtained from an output of the optical Rx circuit to estimate one or more characteristics of the optoelectronic transceiver.

BRIEF DESCRIPTION OF THE DRAWINGS

Embodiments disclosed herein will be described in greater detail with reference to the accompanying drawings which represent example embodiments thereof, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present disclosure. However, it will be apparent to one skilled in the art that principles described herein may be practiced in other embodiments that depart from these specific details. In other instances, detailed descriptions of well-known methods, devices, and circuits are omitted so as not to obscure the description of the example embodiments. Statements herein reciting principles, aspects, and example embodiments are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry embodying the principles of the technology.

Furthermore, the following abbreviations and acronyms may be used in the present document:

PIC Photonic Integrated Circuit
RF Radio Frequency
OSNR Optical Signal to Noise Ratio
ROSNR Required Optical Signal to Noise Ratio
BER Bit Error Ratio
MZM Mach-Zehnder Modulator
MZI Mach-Zehnder Interferometer
PD Photo Detector
PCB Printed Circuit Board
QAM Quadrature Amplitude Modulation
CMOS Complementary Metal-Oxide-Semiconductor
GaAs Gallium Arsenide
InP Indium Phosphide
SOI Silicon on Insulator
SiP Silicon Photonics
ASIC Application Specific Integrated Circuit
FPGA Field Programmable Gate Array
LOC Loopback Optical Circuit
Tx Transmitter
Rx Receiver
OMC Optical Modulator Circuit
PAM Pulse-Amplitude-Modulation
PBSR Polarization Beam Splitter Rotator
PBRC Polarization Beam Rotator Combiner
QPSK Quadrature-Phase-Shift-Keying
ASK Amplitude-Shift-Keying
WDM Wavelength Division Multiplexing Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The terms "connected", "coupled", and their variants are intended to encompass both direct connections and indirect connection through one or more intermediate elements, unless specifically stated otherwise. Radio frequency (RF) may refer to any frequency in the range from kilohertz (kHz) to hundreds of gigahertz (GHz).

One or more aspects of the present disclosure relates to a photonic integrated circuit (PIC) of an optical transceiver comprising an optical transmitter (Tx) circuit, an optical receiver (Rx) circuit, and an integrated optical loopback from the optical Tx circuit to the optical Rx circuit that can be switched on or off. In some implementations the optical transceiver may include a shared local oscillator (LO) circuit with an integrated optical phase shifter for dephasing an LO signal to the optical Rx circuit relative to a loopback optical signal from the optical Tx circuit. In some implementations the optical transceiver may be a dual polarization transceiver, and the integrated optical loopback may include an optical mixer for polarization channel mixing. In some implementations the optical Tx circuit, the optical Rx circuit, and the integrated optical loopback may be implemented in a same photonic chip.

The integrated optical loopback enables a flexible and precise in-field calibration of the transceiver, for example during an automatic start-up sequence of a transponder incorporating the transceiver, which results in an overall improvement of the transponder performance. The in-field transceiver calibration, as enabled by the integrated optical loopback, avoids the propagation of uncertainty of calibration data in traditional transceivers, in which digital and analog interfaces, although hosted on a same PCB, are calibrated separately at their respective manufacturing facilities.

Figure 1:
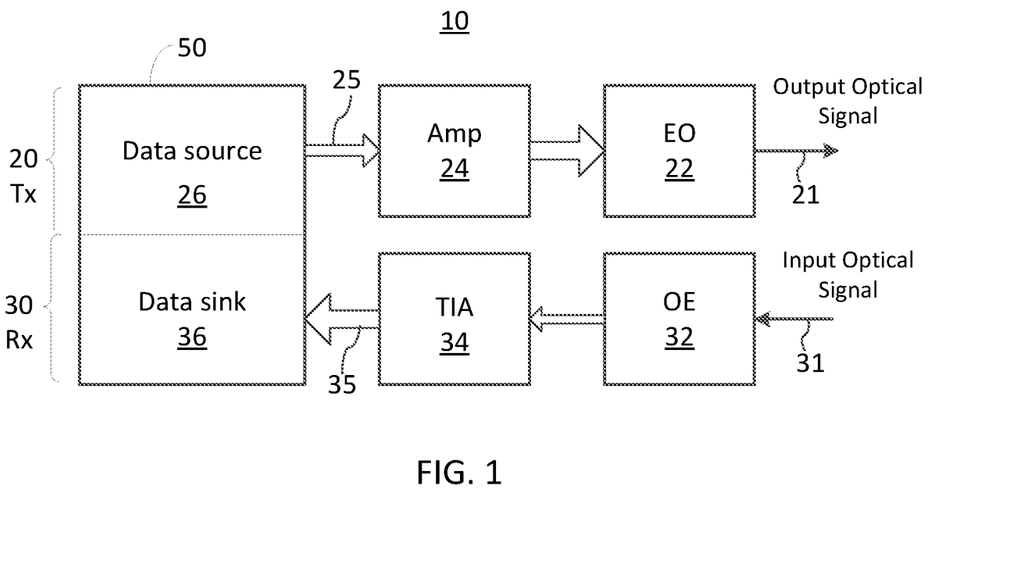
FIG. 1 is a schematic block diagram of an optoelectronic transceiver system.

Referring to FIG. 1, an optical transceiver 10 may include a transmitter (Tx) signal path 20 and a receiver (Rx) signal path 30. The Tx signal path 20 may be formed of a data source 26, an electrical amplifier 24, and an optical Tx circuit 22 that may be in the form of, or include, an electro-optic (EO) converter. The Rx signal path 30 may be formed of a data sink 36, an electrical amplifier 34, and an optical Rx circuit 32 that may include an opto-electric (OE) converter. The electrical amplifier 34 may be in the form of, or include, one or more trans-impedance amplifiers (TIA) and may be referred to hereinafter as TIA 34; however any suitable amplifier may be used. The data source 26 and the data sink 36 may be embodied with a digital signal processor 50, for example but not exclusively a microprocessor, an ASIC, an FPGA, or a combination thereof.

In operation the data source 26 encodes data to be transmitted in accordance with chosen modulation and transmission formats to form one or more electrical Tx signals 25. These one or more electrical Tx signals 25 may be first generated digitally and then converted to the analog domain using a digital to analog converter (DAC), not shown. The one or more electrical Tx signals 25 are passed to the optical Tx circuit 22 after optionally amplified by an electrical amplifier 24. The optical Tx circuit 22 converts the one or more electrical Tx signals 25 into an output optical signal 21 that may be coupled into an optical fiber or otherwise transmitted to a destination over an optical communication link. The optical Rx circuit 32 receives an input optical signal 31, for example from a return optical fiber of the communication link, and converts it into one or more electrical Rx signals 35 in cooperation with the TIA 34. The data sink 36 performs digital signal processing on the electrical Rx signal or signals 35, after their conversion into the digital form by a suitable analog to digital converter (ADC, not shown), to extract transmitted data therefrom. The digital signal processing performed by the data sink 36 may include clock and/or frequency recovery, demodulation, error correction decoding, and other digital signal processing operations as known in the art.

Figure 2:
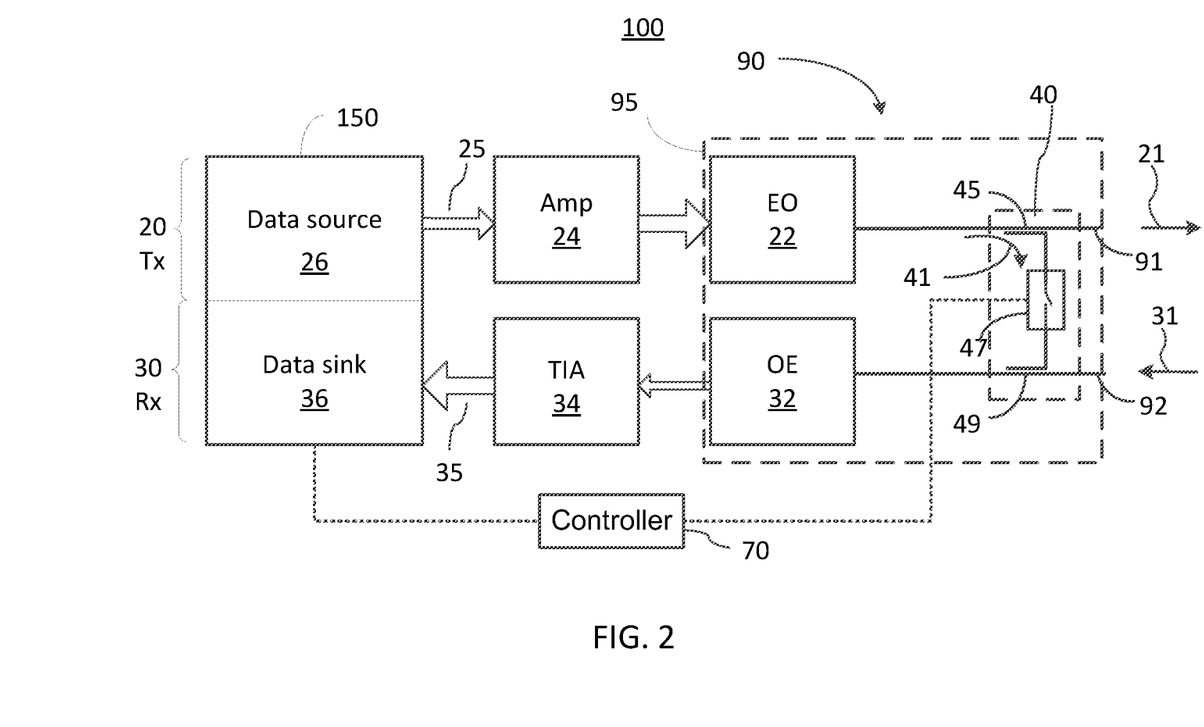
FIG. 2 is a schematic block diagram of an optoelectronic transceiver system with integrated optical loopback.

FIG. 2 illustrates a modification of the optical transceiver 10 of FIG. 1, which may be generally referred to as the optical transceiver 100. In the optical transceiver 100, the optical Tx circuit 22 and the optical Rx circuit 32, or at least a portion thereof, are embodied within a same photonic integrated circuit (PIC) 90, which also includes an integrated loopback optical circuit (LOC) 40. The integrated LOC 40, which may also be referred to herein simply as LOC 40, is configured to switchably direct a loopback optical signal 41 from the output of the optical Tx circuit 22 to an input of the optical Rx circuit 32, to facilitate testing the Tx signal path 20 and the Rx signal path 30 of the optical transceiver 100. The loopback optical signal 41 may be in the form of, or include, the output optical signal 21, or a signal related thereto. PIC 90 has an input PIC port 92 for receiving the input optical signal 31, and an output PIC port 91 for transmitting the output optical signal 21. The optical Rx circuit 32 is optically coupled to the input PIC port 92 and is configured to process the input optical signal 31 for conversion into one or more electrical Rx signals 35. The optical Tx circuit 22 is optically coupled to the output PIC port 91 and is configured to provide the output optical signal 21 and/or the loopback optical signal 41 responsive to the one or more electrical Tx signals 25. The optical Rx circuit 32, the optical Tx circuit 22, and LOC 40 may be implemented in a same photonic chip 95. Optical paths between various elements of PIC 90 are schematically illustrated with solid lines and may be embodied with one or more optical waveguides formed within the photonic chip 95. By way of example, the photonic chip 95 may be a silicon photonics chip, such as a SOI based chip; in other embodiments it may be a GaAs based chip, an InP based chip, or a chip of any other suitable material system.

LOC 40 is configured to switchably couple the loopback optical signal 41 into the optical Rx circuit 32 for testing and/or tuning one or more parameters of the optical transceiver 100. The testing may include measuring and/or tuning one or more parameters related to one of: the optical Rx circuit 32, the optical Tx circuit 22, the one or more electrical Rx signals 35, or the one or more electrical Tx signals 25. LOC 40 may include an optical switching circuit 47 configured to switchably block the optical Rx circuit 32 from receiving the loopback optical signal 41. The optical switching circuit 47 may be electrically controlled from a controller 70. The optical switching circuit 47 may be for example in the form of one or more electrically controlled optical shutters. An optical shutter may be implemented for example with a variable optical attenuator (VOA), such as but not exclusively a p-i-n diode-based VOA, a Mach-Zehnder-Interferometer (MZI), a ring resonator, a micro-electro-mechanical system (MEMS), a combinations thereof, or as any other suitable optical shutter that may be integrated in a same PIC with the optical Rx and Tx circuits and which may be electronically controlled. One or more optical couplers 45, 49 may be used to couple the loopback optical signal 41 from an output of the optical Tx circuit 22 into the optical Rx circuit 32. In some embodiments the optical coupler 45 providing the optical loopback signal 41 may be an output coupler of the optical Tx circuit 22. In some embodiments the output optical coupler 49 of LOC 40 may be an input coupler or mixer of the optical Rx circuit 32.

The optical Tx circuit 22 may be implemented using one or more optical modulators, such as for example, but not exclusively, one or more MZMs. Embodiments wherein the optical Tx circuit 22 is implemented with one or more directly modulated lasers would also be within the scope of the present disclosure. The optical Rx circuit 32 may include one or more photodetectors (PDs), and may also include one or more optical couplers and/or one or more optical mixers such as optical hybrids. A loopback controller 70 may be provided to control the optical switching circuit 47 to couple the loopback optical signal 41 into the optical Rx circuit 32 when the optical transceiver is in a loopback mode, and to block the loopback optical signal 41 from being received by the optical Rx circuit 32 during regular operation of the optical transceiver 100, when the optical transceiver 100 is operable to receive and transmit optical signals from an optical communication link. In some embodiments the loopback controller 70 may be automatically activated at a transceiver start-up to perform loopback measurements. In some embodiments the loopback controller 70 may be remotely controlled over a network to enable remote transceiver testing using the integrated loopback. The loopback controller 70 may be in communication with a digital signal processor 150, which may be an embodiment of processor 50 described above, and may be further configured to perform signal processing operations for transceiver testing when the optical transceiver is in the loopback mode of operation. Processor 150 may also communicate with the loopback controller 70 to switch between the loopback mode and a regular mode of transceiver operation.

Figure 3:
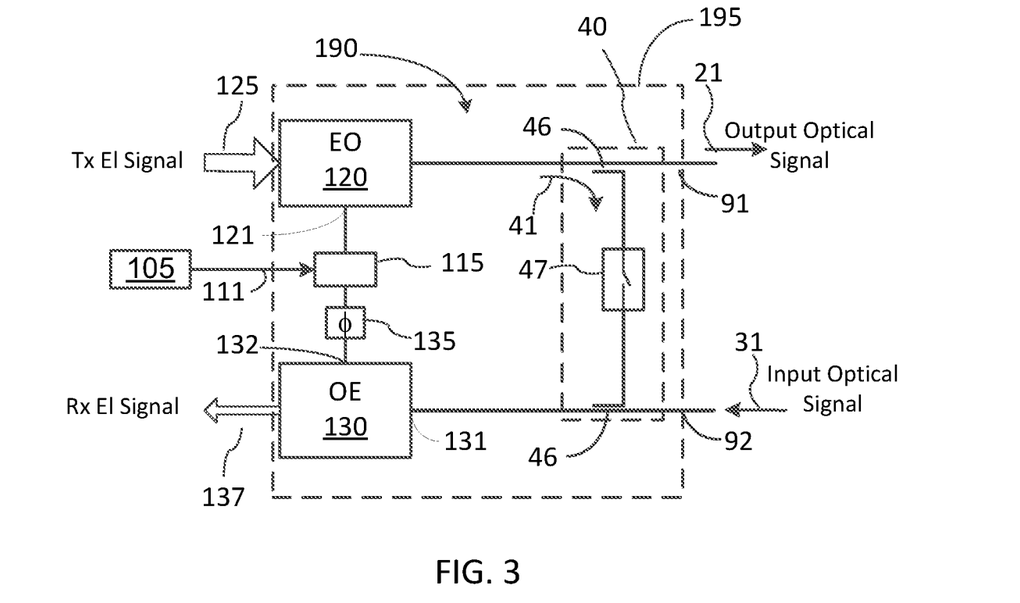
FIG. 3 is a schematic block diagram of an example optical front-end of an optoelectronic transceiver system with integrated optical loopback and a local oscillator dephasing.

FIG. 3 schematically illustrates a PIC 190, which may be an embodiment of PIC 90 and may operate as an optical front end of an optical transceiver such as that illustrated in FIGS. 1 and 2. Similarly to PIC 90, PIC 190 includes an integrated LOC 40 which may be as generally described above with reference to PIC 90 and FIG. 2, an optical Rx circuit 130 coupled to an input PIC port 92, and an optical Tx circuit 120 coupled to an output PIC port 91. In some embodiments PIC 190 may be implemented in one photonic chip 195. Optical paths between various elements of PIC 190 are schematically illustrated with solid lines and may be embodied with one or more optical waveguides formed in the photonic chip 195.

The optical Tx circuit 120 may be in the form of, or include, an optical modulator configured to modulate input light 111 responsive to an electrical Tx signal 125. An input optical port 121 of the optical Tx circuit 120 is coupled to a light source port 115 configured to receive the input light 111 from a suitable light source 105, such as for example a single-frequency semiconductor laser. In some embodiments the light source 105 providing the input light 111 may be incorporated in PIC 190. In some embodiments the light source 105 may be external to PIC 190.

The optical Rx circuit 130 may include a local oscillator (LO) port 132 and may be configured for coherent optical detection, wherein the input optical signal 31 is coherently mixed with LO light received in the LO port 132. In some embodiments the LO port 132 of the optical Rx circuit 130 may be optically coupled to the light source port 115, with a fraction of the input light 111 directed into the LO port 132 as the LO light, for mixing with an optical signal received into a signal port 131.

When PIC 190 operates in a loopback mode, the optical switching circuit 47 is switched to a "pass-through" state, allowing a loopback optical signal 41 from an output port of the optical Tx circuit 120 to be coupled into the signal port 131 of the optical Rx circuit 130, where it is coherently mixed with the LO light. An electrical or optical signal at the output of the optical Rx circuit 130 may be sensitive to an optical phase difference $\Delta\phi_{sLO}=(\phi_s-\phi_{LO})$ between an optical phase $\phi_s$ of light received in the signal port 131 and an optical phase $\phi_{LO}$ of light received in the LO port 132, which may be referred to as the signal-to-LO phase difference.

In regular operation, when the optical signal received in the signal port 131 of the optical Rx circuit 130 is the input optical signal 31 received in the input PIC port 92, e.g. from an optical fiber link, the phase difference $\Delta\phi_{sLO}$ is generally unknown and may fluctuate. To account for this unknown phase the Rx signal path 30 of the transceiver may have to perform phase recovery processing, which may be generally designed to recover one or more transmitter generated signals or signal channels from the received input optical signal 31 when the phase difference $\Delta\phi_{sLO}$ is most unfavorable for the coherent signal detection.

In order to reproduce the signal—LO mixing conditions in the loopback mode that emulate conditions during normal transceiver operation, including operating conditions which may be less favorable for the coherent signal detection, in some embodiments PIC 190 may include an optical phase shifter 135 in the optical path between the light source port 115 and the LO port 132. In some embodiments, the optical phase shifter 135 may be dynamically tunable during a test in the loopback mode of operation to evaluate the operation of the phase recovery processing in the Rx signal path of the transceiver in dependence on the signal—LO phase difference $\Delta\phi_{sLO}$. In some embodiments the optical phase shifter 135 may be factory pre-set to a state that corresponds to a less-favorable, or the least-favorable, LO-signal mixing in the loopback mode of operation of the transceiver. In some embodiments the least-favorable LO-signal mixing may correspond, for example, to $\Delta\phi_{sLO}=45°$; in some embodiments a range of $\Delta\phi_{sLO}$ corresponding to less-favorable LO-signal mixing conditions may be explored, such as for example from about 20° to 70°. These unfavorable LO-signal mixing conditions, which may be termed "LO dephasing", may in some embodiments correspond to mixing of different transmitter-generated signal channels in the output signal or signals 137 of the optical Rx circuit 130.

Figure 4:
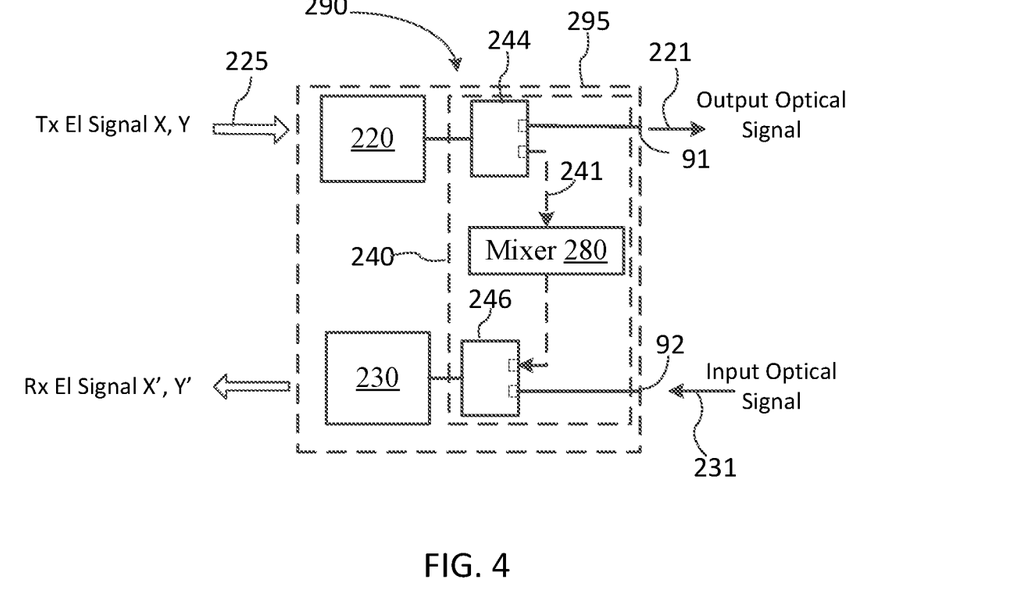
FIG. 4 is a schematic block diagram of an example optical front-end of an optoelectronic transceiver system with channel mixing in the integrated optical loopback.

FIG. 4 schematically illustrates PIC 290, which may be an embodiment of PIC 90 and may operate as an optical front end of an optoelectronic transceiver such as that illustrated in FIGS. 1 and 2. Similarly to PIC 90 and PIC 190, PIC 290 includes an integrated LOC 240, an optical Rx circuit 230 coupled to an input PIC port 92, and an optical Tx circuit 220 coupled to an output PIC port 91. An optical Rx circuit 230 may be an embodiment of an optical Rx circuit 32 or 130 as generally described above with reference to PIC 90 of FIG. 2 and PIC 190 of FIG. 3. An optical Tx circuit 220 may be an embodiment of an optical Tx circuit 22 or 120 as generally described above with reference to PIC 90 of FIG. 2 and PIC 190 of FIG. 3. LOC 240 may be an embodiment of LOC 40 described above.

The optical Tx circuit 220 may be configured to provide, responsive to an electrical Tx signal 225, an output optical signal 221 that includes two optical signal channels, which may be differently modulated and may be referred to herein as a first optical channel or as the "X" channel, and a second optical channel that may be referred to as the "Y" channel. Similarly, the Rx circuit 230 may be configured to receive an input optical signal 231 that may also include two optical signal channels "X" and "Y". The Rx signal path of the optical transceiver in which PIC 290 is used may be configured to de-multiplex the "X" and "Y" channels from the received optical signal. LOC 40 may be configured to switchably couple a loopback optical signal 241 from the optical Tx circuit 220 into the optical Rx circuit 230. The loopback optical signal 241 may include the "X" and "Y" channels generated by the optical Tx circuit 220. In some embodiments wherein the optical Tx circuit 220 includes an optical modulator, PIC 290 may include an optical source port (not shown) coupled to an input port of the optical modulator as described above with reference to FIG. 3. In some embodiments the optical Rx circuit 230 may be configured for coherent detection and include an LO port that is coupled to the optical source port of the PIC via a phase shifter as described above with reference to FIG. 3.

During regular operation of the transceiver in a communication link, the "X" and "Y" channels may be intermixed in the received input optical signal 231, which may complicate the de-multiplexing of these two channels from the received optical signal by the transceiver. In order to reproduce the operating conditions in the field, in some embodiments LOC 240 may incorporate a channel mixer 280 configured to intermix the Tx-generated "X" and "Y" optical channels of the loopback optical signal 241 prior to coupling the loopback optical signal 241 into the optical Rx circuit 230. In some embodiments, the "X" and "Y" channels may represent two polarization channels of the input optical signal 231, as described below in further detail. In some embodiments PIC 290 may be implemented in one photonic chip 295, which may be an embodiment of the photonic chip 95 or the photonic chip 195 described above. Optical paths between various elements of PIC 290 are schematically illustrated with solid lines and may be embodied with one or more optical waveguides formed within the photonic chip 295.

A first optical switching or coupling element 244 may be disposed in an optical path from the optical Tx circuit 220 to the output PIC port 91, and configured to couple at least a portion of the output optical signal 221, or a signal related thereto, into the channel mixer 280 as the loopback optical signal 241. A second optical switching or coupling element 246 may be disposed in an optical path from the input PIC port 92 to the optical Rx circuit 230, and configured to couple the loopback optical signal 241 with intermixed optical channels into the optical Rx circuit 230. At least one of the first optical switching or coupling element 244, or the second optical switching or coupling element 246 may be electronically switchable between a state in which LOC 240 allows the loopback optical signal 241 to be coupled into the optical Rx circuit 230, and a state in which LOC 240 substantially blocks the loopback optical signal 241 from being coupled into the optical Rx circuit 230. In some embodiments one of the first optical switching or coupling element 244 and the second optical switching or coupling element 246 may be in the form of, or include, an electrically-controlled optical switch, while the other of the first optical switching or coupling element 244 and the second optical switching or coupling element 246 may be a passive optical coupler. In some embodiments each of the first optical switching or coupling element 244 and the second optical switching or coupling element 246 may be in the form of, or include, an electrically-controlled optical switch.

Figure 5:
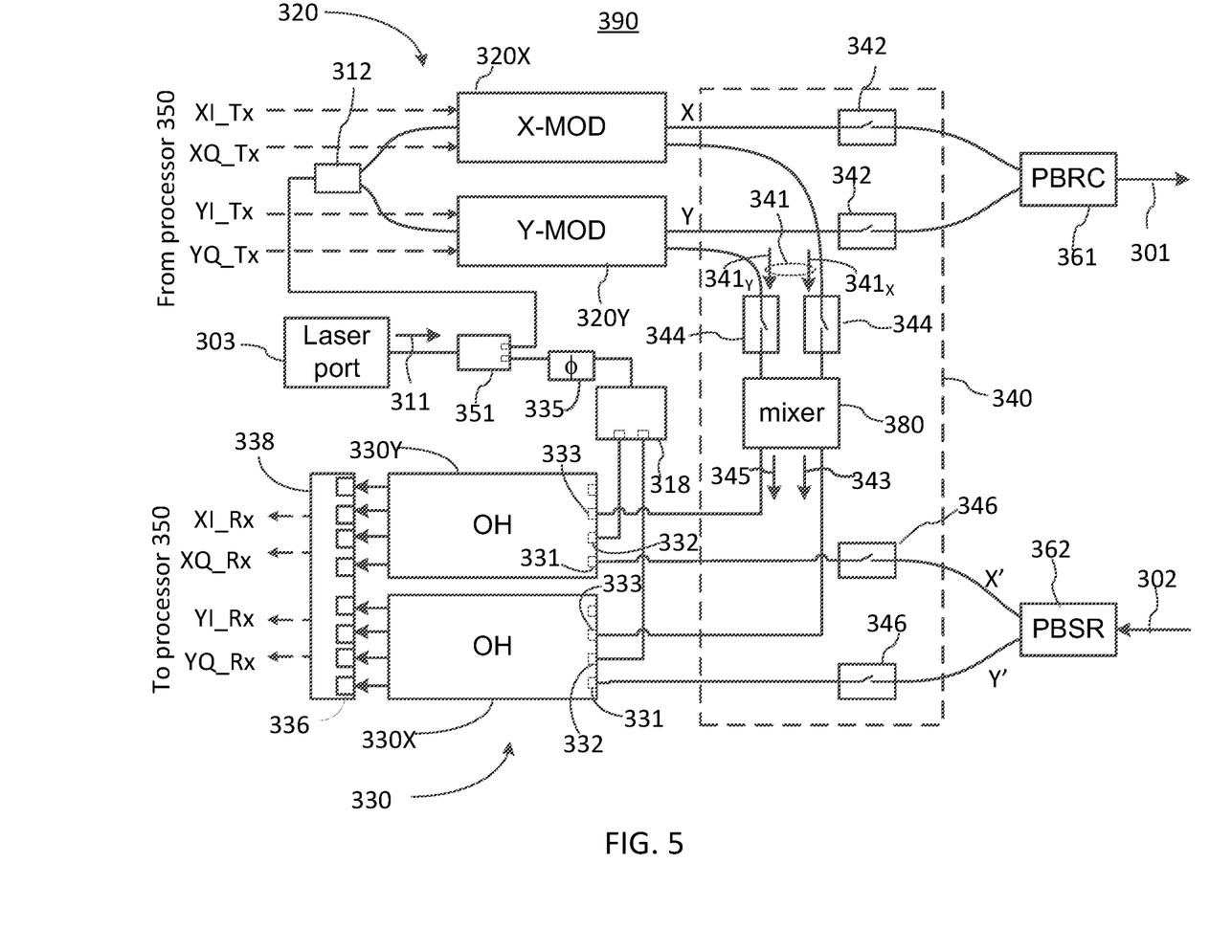
FIG. 5 is a schematic circuit diagram of a PIC implementing a dual-polarization diversity coherent optical transceiver with an integrated optical loopback.

FIG. 5 schematically illustrates PIC 390, which may be an embodiment of PIC 290 or PIC 190, and may be operable as an optical front end of an optoelectronic transceiver, such as transceiver 100 of FIG. 2. In the illustrated embodiment PIC 390 is configured to transmit, and coherently receive, optical signals comprising two polarization multiplexed optical channels, and combines features described hereinabove with reference to FIGS. 2-4 and PICs 90, 190, and 290. PIC 390 includes an integrated LOC 340, an optical Rx circuit 330, and an optical Tx circuit 320, which may all be embodied in a same photonic chip, generally as described above with reference to FIGS. 2-4. Optical paths between various elements of PIC 390 are schematically illustrated with solid lines and may be embodied with planar optical waveguides formed in the photonic chip implementing the PIC. The optical Tx circuit 320 is configured to separately output two optical channels, which may be separately guided to a PIC output port 361 for combining into an output optical signal 301. The PIC output port 361 may be in the form of, or include, a polarization beam rotator and combiner (PBRC) 361. The optical Rx circuit 330, which is configured as a dual coherent optical receiver, is coupled to a PIC input port 362, which may be in the form of, or include, a polarization beam splitter and rotator (PBSR).

The dual optical Tx circuit 320 is embodied as an optical modulator circuit (OMC) formed of a first optical modulator 320X and a second optical modulator 320Y, which are connected in parallel between an optical splitter 312 and the PBRC 361. The optical splitter 312 may be referred to herein as the OMC input splitter 312, and may embody an input optical port of the OMC. The first optical modulator 320X may be referred to as the X-channel modulator. The second optical modulator 320Y may be referred to as the Y-channel modulator. Input optical ports of the two modulators 320X and 320Y are optically coupled to a light source port 303 via the OMC input splitter 312 and an optical splitter 351. The optical splitter 351 may be referred to herein as the first LO optical splitter 351. The light source port 303 may be an embodiment of the light source port 115 and may be configured to receive input light 311 from a suitable light source (not shown), such as for example a single frequency laser. In some embodiments the light source port 303 may be in the form of, or include, an edge coupler. In some embodiments the light source port 303 may be in the form of, or include, a grating coupler. In some embodiments the light source may be incorporated into the PIC 390. In some embodiments the light source port 303 may be in the form of, or include, a suitable light source such as a single-frequency semiconductor laser. The optical splitter 351 is configured to split the input light 311 into two light fractions, one of which is guided to the input optical coupler 312 of the OMC 320, and the other is guided to the optical Rx circuit 330 as the LO light, as described below.

In operation the first optical modulator 320X modulates a first fraction of the input light 311 responsive to an X-channel electrical Tx signal or signals, and outputs an optical X-channel signal, which may also be referred to as a first optical channel. The second optical modulator 320Y modulates a second fraction of the input light 311 responsive to a Y-channel electrical Tx signal or signals, and outputs an optical Y-channel signal, which may also be referred to as the second optical channel. The PBRC 361 may be configured to rotate the polarization of one of the Y-channel or X-channel optical signals received from the first optical modulators 320X or the second optical modulator 320Y, and combine them by polarization multiplexing to form the output optical signal 301, in which the optical X-channel signals and Y-channel signals are combined in orthogonal polarizations.

The dual optical Rx circuit 330 includes a first optical mixer (OM) 330X and a second optical mixer (OM) 330Y, each of which having two or more input ports and one or more output ports, and configured to coherently mix light received into the input ports and to output mixed light from each of the one or more output ports. The OMs 330X, 330Y are connected to different output ports of the PBSR 362 to process two orthogonal polarizations of an input optical signal 302. The input optical signal 302 may be generated by a remote transceiver that may be similar to the transceiver incorporating PIC 390, and may be received by the PBSR 362 from an optical communication link. In the illustrated embodiment each of the first OM 330X and the second OM 330Y is embodied as a 90° optical hybrid (OH) having at least two input ports 331, 332 and four output ports. Embodiments in which the OMs 330X, 330Y are in the form of 120° optical hybrids, 2×2 optical couplers, 2×1 optical couplers are also within the scope of the present disclosure. In various embodiments each of the OMs 330X, 330Y may be in the form of one or more MMI couplers, one or more evanescent waveguide couplers, or a combination thereof. The input port 331 of each OM 330X, 330Y is configured as a signal port, while the input port 332 is configured as the LO port; these designations may be changed in other embodiments. The signal ports 331 may be referred to also as the first signal ports. Each of the output ports of the first and second OMs 330X, 330Y may be coupled to a different photodetector (PD) 336, which together may form a PD circuit 338. In some embodiments the PDs 336 may be incorporated in the PIC 390 and may be viewed as a part of the optical Rx circuit 330.

In the illustrated embodiment the first signal ports 331 of each OM 330X, 330Y are optically coupled to the PBSR 362, and the LO ports 332 are optically coupled to the light source port 303 via the first LO optical splitter 351 that provides the LO light, and a second LO optical splitter 318 which splits the LO light between the LO ports 332 of the first and second OM 330X, 330Y. Each of the first OM 330X and the second OM 330Y may also have a second signal port 333 that may be coupled to LOC 340 to receive a portion of the loopback optical signal 341. In some embodiment a phase shifter 335 may be provided in the optical path of the LO light as described above with reference to FIG. 3 and the optical phase shifter 135.

LOC 340 may be configured to switchably couple output ports of the first and second optical modulators 320X, 320Y to the first signal ports 331 of the first and second OMs 330X, 330Y, so that the loopback optical signal 341 from the optical Tx circuit 320 reaches the signal ports of the OMs 330X, 330Y in the loopback mode of transceiver operation, but is blocked from the OMs 330X, 330Y during regular operation of the transceiver when the transceiver communicates with an external optical link. The loopback optical signal 341 is composed of an X-channel optical signal 341x received from an output port of the first optical modulator 320X, and a Y-channel optical signal 341y received from an output port of the second optical modulator 320Y. The X-channel and Y-channel optical signals 341x, 341y may also be referred to as the first and second optical channels. Two optical shutters 344 may be disposed in the optical paths of the X-channel and Y-channel optical signals 341x, 341y from the optical modulators 320X, 320Y to the OMs 330X, 330Y. The optical shutters 344 may be electrically switched between a "pass-through" state, in which the loopback optical signals 341x, 341y are allowed to reach the OMs 330X, 330Y, and a "blocking" state in which substantially no loopback signal reaches the optical Rx circuit 330. Here "substantially" means an attenuation of the loopback signal in the blocking state that results in a residual loopback signal leaking into the Rx optical circuit that is sufficiently low in power so as not to increase the ROSNR for error-free detection, which may depended on a used modulation format. By way of example, for detection of QPSK optical signal with the ROSNR of 10 dB, during normal operation of the transceiver the ratio of the residual loopback signal power to an input optical signal power may be on the order of or below 1%, or for higher QAM-orders, such as 32 QAM or 64 QAM, on the order of or below 0.1%. Depending on the expected input optical signal power entering the PIC at the PIC input port 362 and depending on the loopback optical signal power at the optical blockers 344, this may correspond to an attenuation at the blockers 344 in their "blocking" state in the range of 20 dB to 50 dB relative to the pass-through state. Optionally additional optical shutters 342 may be provided in the optical paths from the modulators 320X and 320Y to the output PBRC 361 to block the output optical signals of the modulators from reaching the PIC output port 361 in the loopback mode. Also optionally optical shutters 346 may be provided in the optical paths from the input PBSR 362 to the OMs 330X and 330Y to block any light signal that may be received in the PIC input port 362 from reaching the OMs 330X,Y in the loopback mode while the transceiver is being tested. Optical shutters 342, 344, 346 may be implemented with a variety of optical devices as described above with reference to FIGS. 2 and 3.

They may be electronically controlled by transceiver electronics to switch between a loopback mode of operation in which the loopback optical signal 341 is coupled into the optical Rx circuit 330, and a regular mode of operation in which the loopback optical signal 341 is blocked from the optical Rx circuit 330, while the input optical signal 302 may be received by the optical Rx circuit 330. In some embodiments a 2×2 optical switch may be used in place of the optical shutters 342 and 344. Optical shutters 344 may also be placed in the optical paths of the mixed optical loopback signals 345, 343 downstream of the loopback optical mixer 380.

In some embodiments LOC 340 may include a first optical channel mixer 380 disposed in the optical path of the optical loopback signal 341 to intermix the optical signals or channels 341x, 341y prior to coupling into the signal ports of the OM 330X and OM 330Y. The first optical channel mixer 380 may also be referred to herein as the loopback optical mixer 380. The presence of the loopback optical mixer 380 enables the transceiver to emulate, in the loopback mode of operation, signal reception conditions during normal operation of the transceiver when the polarization state of the input optical signal 302 is unknown, and light received in each of the OMs 330X, 330Y may be a mix of the X-channel and Y-channel signals of the remote transceiver. In the absence of an optical channel mixer in LOC 340, the X-channel and Y-channel signals generated in the Tx signal path would be mapped one-to-one to the X-channel and Y-channel signals at the outputs of the OM 330X and 330Y; this could complicate testing polarization channel demultiplexing by the Rx signal path of the transceiver, and make it more difficult to separate Rx-related channel impairments from Tx-related channel impairments, and to determine the origin of such channel impairments as timing skews, power imbalance, S-parameters, and the like.

The optical channel mixer 380 may be embodied, for example, as a 2×2 optical coupler, and configured to mix the loopback optical channels 341x and 341y received from output ports of the first and second optical modulators 320X, 320Y, respectively, and to output a first mixed loopback optical signal 343 and a second mixed loopback optical signal 345. In some embodiments the 2×2 optical coupler implementing the optical channel mixer 380 may have a 1:1 splitting ratio between output ports, so that each of the loopback optical channels 341x and 341y is equally split between the first and second mixed loopback optical signals 343, 345. The first and second mixed loopback optical signal 343, 345 may be guided into the second signal ports 333 of the first OM 330X and the second OM 330Y, respectively, for example using optical waveguides. In other embodiments the mixed loopback optical signal 343, 345 may be coupled into the first signal ports 331 of the first OM 330X and the second OM 330Y using optical couplers and/or optical switches, for example as described above with reference to FIGS. 3 and 4.

In some embodiments PIC 390 may be configured to operate with quadrature modulated (QM) optical signals, wherein the X and Y optical channels at both the Rx and Tx sides comprise each an in-phase (I) signal component and a quadrature-phase (Q) signal component. This yields four signal channels in total, or per wavelength, which may be denoted as the XI, XQ, YI, and YQ channels. In such embodiments the first optical modulator 320X may be an IQ modulator configured to convert an XI-channel electrical Tx signal "XI_Tx" and an XQ-channel electrical Tx signal "XQ_Tx" into an optical XI-channel signal "XIopt" and an optical XQ-channel signal "XQopt", respectively, and combine them in quadrature into an X-channel optical signal "Xopt". The second optical modulator 320Y may be an IQ modulator configured to convert a YI-channel electrical Tx signal "YI_Tx" and a YQ-channel electrical Tx signal "YQ_Tx" into an YI-channel optical signal "YIopt" and an YQ-channel optical signal "YQopt", respectively, and combine them in quadrature into a Y-channel optical signal "Yopt". The optical signals XIopt, XQopt, YIopt, and YQopt may be referred to as the XI optical signal, the XQ optical signal, the YI optical signal, and the YQ optical signal, respectively.

Accordingly, in some embodiments the first loopback optical channel 341x, which is sourced from an output of the X-channel optical modulator 320X, may include the XI-channel optical signal "XIopt" and the XQ-channel optical signal "XQopt" that are produced by the first optical modulator 320X. The second loopback optical channel 341y, which is sourced from an output of the Y-channel optical modulator 320Y, may include the YI-channel optical signal "YIopt" and the YQ-channel optical signal "YQopt" that are generated by the second optical modulator 320Y.

Figure 6:
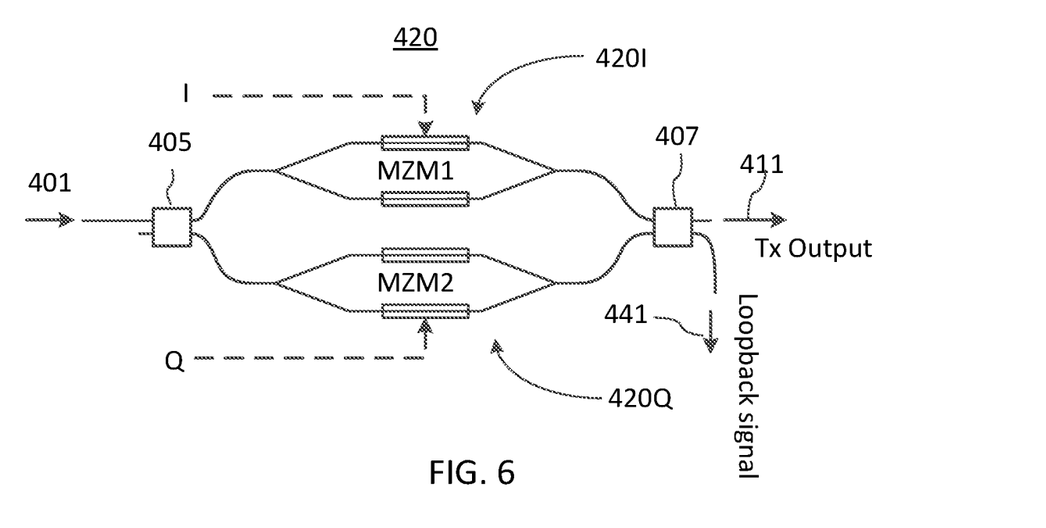
FIG. 6 is a schematic diagram of a nested Mach-Zehnder modulator (MZM) with an output 2×2 coupler providing an optical loopback signal from a second output port.
Figure 7:
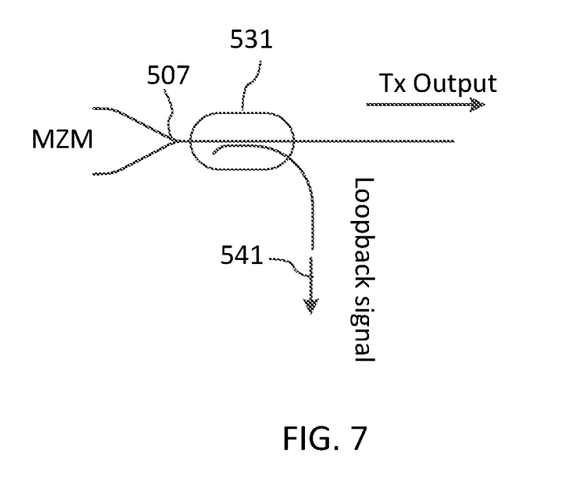
FIG. 7 is a schematic diagram of an MZM output circuit having an optical loopback signal tapped off from a main output signal of the MZM.

FIG. 6 illustrates an example IQ modulator 420 that may implement each one of the first and second optical modulators 320X and 320Y in some embodiments. The IQ modulator 420 is a nested MZM formed of two inner MZMs 420I and 420Q connected optically in parallel between an input optical coupler 405 and an output optical coupler 407. In operation electrical "I" and "Q" signals are applied to the inner MZMs 420I and 420Q, respectively, to modulate input light 401 therewith. Modulated light at the output of the inner MZMs 420I and 420Q is summed in quadrature at the output coupler 407 to produce a QM optical signal 411, which may be guided to an output optical port of the PIC in which the IQ modulator 420 is implemented, for example to the PBRC 361 of PIC 390. In some embodiments the output coupler 407 may be a 2×2 coupler with two output coupler ports, each of which may output a QM optical signal comprising I and Q optical channels modulated by the electrical "I" and "Q" signals, respectively, that are combined in quadrature. In some embodiments a first output coupler port of the output optical coupler 407 may be optically coupled to the output PIC port, for example to the PBRC 361 of PIC 390, and a second output coupler port may be optically coupled to a loopback optical circuit, such as for example LOC 340, to provide a loopback optical signal 441. The loopback optical signal 441 may represent either one of the first loopback optical signal 341x or the second loopback optical signal 341y in the embodiment of FIG. 5. In some embodiments a loopback optical signal may be a tapped off fraction of the output optical signal 411 obtained using a tap-off coupler disposed in an optical path from the output optical coupler 407 of the modulator to the output PIC port. This is schematically illustrated in FIG. 7 wherein a loopback optical signal 541 is tapped-off from a same output port of an output coupler 507 of an optical modulator, for example an MZM, using an optical tap coupler 531. The loopback optical signal 541 may represent either one of the first loopback optical signal 341x or the second loopback optical signal 341y in the embodiment of FIG. 5.

Referring back to FIG. 5, the optical Rx circuit 330 in such embodiments may be in the form of a dual phase-diversity coherent optical receiver configured to process an input optical signal 302 carrying two QM optical channels in each of two orthogonal polarizations, i.e. the XI, XQ, YI, and YQ channels generated in a Tx signal path of a remote transceiver (not shown). The phase diversity reception may be accomplished for example by embodying each of the OMs 330X, 330Y as a 90° hybrid, and differentially connecting the PDs 336 in the PD circuit 338 in pairs, as known in the art. Responsive to receiving QM optical signals into signal ports 331 or 333 and the LO light into the LO ports 332, the OMs 330X, 330Y may cooperate with the PD circuit 338 to provide two quadrature electrical signals in each of the X and Y channels of the Rx signal path, outputting in total four Rx electrical signals that may be denoted XI_Rx, XQ_Rx, YI_Rx, and YQ_Rx.

In regular operation the polarization state of the input optical signal 302 and the LO-signal phase difference $\Delta\phi_{sLO}$ at each OM 330Y, 330X are generally unknown and may fluctuate, and the electrical Rx signals XI_Rx, XQ_Rx, YI_Rx, and YQ_Rx at the output of the PD circuit 338 do not generally map one-to-one to the XI, XQ, YI, and YQ signal channels of the input optical signal, but include each a mixture of two or more transmitter-defined channels. To account for this, the Rx signal path of the transceiver may perform a number of signal processing steps, such as polarization demultiplexing and phase recovery processing, which may be generally designed to recover the transmitter generated XI, XQ, YI, and YQ signal channels from the received input optical signal 302 when the polarization and IQ channels are strongly intermixed. The loopback optical mixer 318 mixes the X- and Y-channels of the loopback optical signal 341, but the I and Q channels thereof may remain not mixed unless the phase of the LO light entering the OMs 330X, 330Y is suitably controlled. The mapping of, for example, the XI_Tx and XQ_Tx signals at the input of the optical Tx circuit 320 to the XI_Rx and XQ_Rx signals at the output of the optical Rx circuit 330 in the loopback mode depends on the phase difference $\Delta\phi_{XsLO}$ between the signal and LO light at the inputs of the X-channel OM 330X. Similarly, the mapping of the YI_Tx and YQ_Tx signals at the input of the optical Tx circuit 320 to the YI_Rx and YQ_Rx signals at the output of the optical Rx circuit 330 in the loopback mode depends on the phase difference $\Delta\phi_{YsLO}$ between the signal and LO light at the inputs of the Y-channel OM 330Y.

By way of example, in the absence of the loopback optical mixer 380, if $\Delta\phi_{XsLO}$ is 0 or 180°, XI_Tx will be mapped to XI_Rx, and XQ_Tx will be mapped to XQ_Rx. If $\Delta\phi_{XsLO}$ is +\−90°, XI_Tx will be mapped to XQ_Rx, and XQ_Tx will be mapped to XI_Rx. If $\Delta\phi_{XsLO}$ is neither one of 0, +\−90°, or 180°, for example $\Delta\phi_{XsLO}$=+\−45°, XI_Tx will be mapped to a mixture of XI_Rx and XQ_Rx, and XQ_Tx will be mapped to a mixture of XQ_Rx and XI_Rx. Similar relationships hold for the mapping of the YI_Tx and YQ_Tx signals to the YI_Rx and YQ_Rx signals in dependence on $\Delta\phi_{YsLO}$.

Thus, the optical phase tuner 335 may effectively function as an IQ channel mixer, and may be referred to as the second optical channel mixer. In some embodiments, the optical phase tuner 335 may be configured to provide an effective mixing of the Tx-generated I and Q channels at the output of the PD circuit 338. In some embodiments the optical phase tuner 335 may be configured to be tuned over a suitably broad range of the optical phase shift to explore various degrees of the IQ channel mixing, for example it may be configured to be tuned over 90° optical phase shift range or more, or 180° degrees or more. The ability to tune the degree of IQ channel mixing may facilitate estimating signal impairments in the Rx signal path and the Tx signal path of the transceiver separately from each other.

Figure 8:
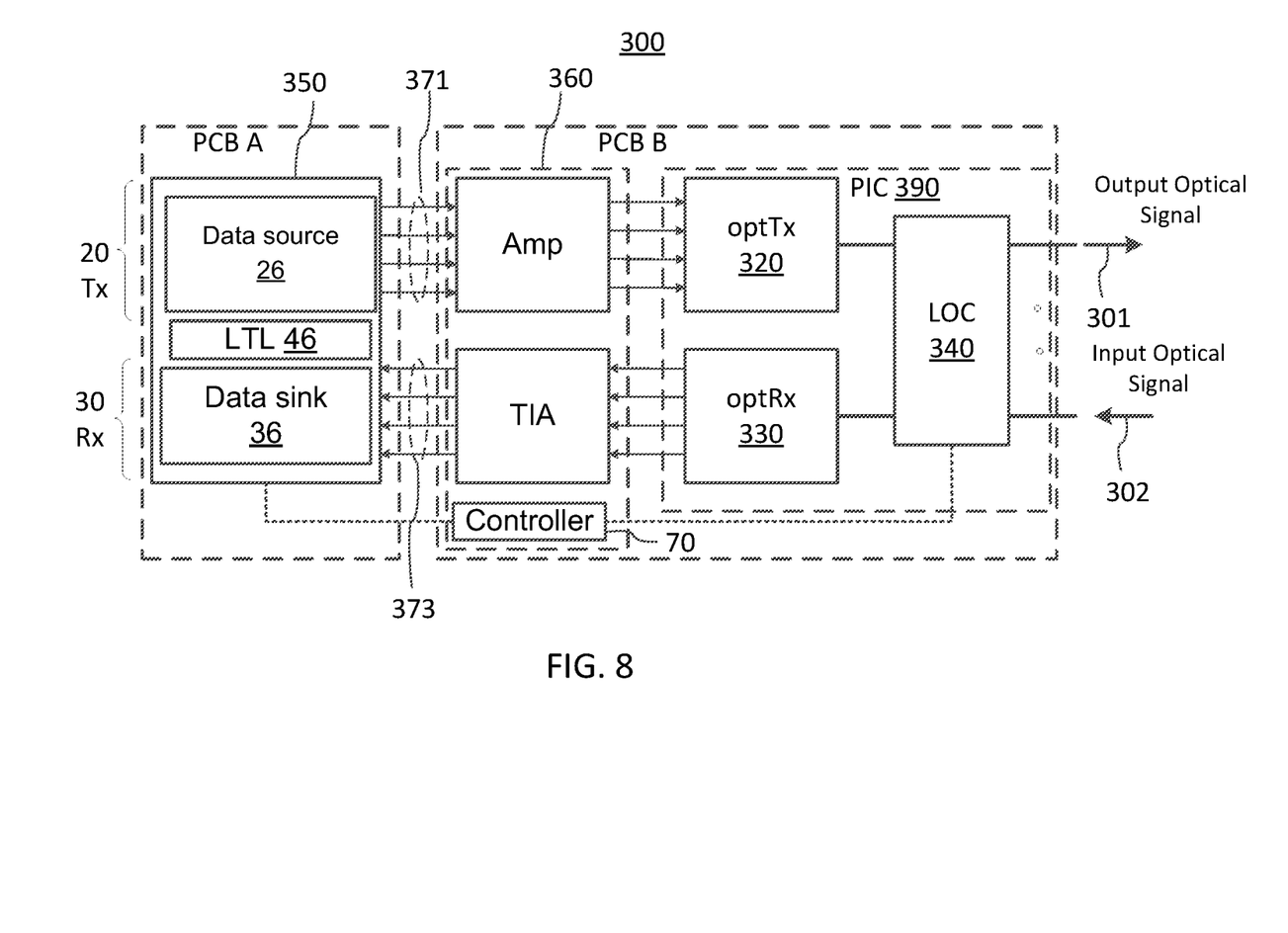
FIG. 8 is a schematic block diagram of an example implementation of the optoelectronic transceiver system of FIG. 3 incorporating the PIC of FIG. 5 as an optical front-end and configured to perform self-test using the integrated optical loopback.

Referring to FIG. 8, there is schematically illustrated an optoelectronic transceiver 300 which may include PIC 390 as its optical front-end. The optoelectronic transceiver 300, which may also be referred to as the host transceiver, may also include a digital signal processor 350 and analog electrical circuitry 360 interfacing processor 350 and PIC 390. Processor 350 may be an embodiment of processor 50 or 150, and may include a data source module 26, a data sink module 36, and loopback test logic (LTL) 46. The analog electrical circuitry 360 may include electrical amplifiers in at least one of the Rx and Tx signal paths, and a loopback controller 70 for switching LOC 340 between the loopback state and the regular operation state, as described above. LTL 46 may be configured to perform, in cooperation with the data source 26 and the data sink 36, signal processing operations for testing the host transceiver 300 when the host transceiver is in the loopback mode, and LOC control operations. The data source module 26 is configured to generate, from input data signals, electrical Tx signals 371 that may comprise the XI_Tx, XQ_Tx, YI_Tx, and YQ_Tx signals. The data sink module 26 is configured to receive electrical Rx signals 373 that may comprise the electrical Rx signals XI_Rx, XQ_Rx, YI_Rx, and YQ_Rx, and to process these signals to recover transmitter-generated XI, XQ, YI and YQ signal channels.

In some embodiments PIC 390 may be installed in a PCB "B" that may also host the analog electrical circuitry 360. In some embodiments the digital signal processor 350 may be installed in the same PCB "B", or in a different PCB "A" that is connected to PCB "B" by signal lines suitable to transmit the Tx signals 371 and the electrical Rx signals 373 therebetween.

Referring to FIGS. 5 and 8, during regular operation of the host transceiver 300 the loopback is blocked, and the optical Rx circuit 330 may receive a dual-polarization (DP) QM optical signal from a remote transceiver (not shown) as the input optical signal 302. Due to channel mixing related to polarization rotation, chromatic dispersion, polarization mode dispersion in the optical link, and due to an unknown and possibly varying phase offset between the LO light and the received optical signal in the optical Rx circuit 330, each of the electrical Rx signals 373 XI_Rx, XQ_Rx, YI_Rx, and YQ_Rx may be some combination of the XI, XQ, YI, and YQ signal channels of the remote transceiver, which may also be somewhat distorted during propagation. The data sink module 36 of processor 350 of the host transceiver may be configured to recover the transmitter-generated XI, XQ, YI, and YQ signal channel from the electrical Rx signals XI_Rx, XQ_Rx, YI_Rx, and YQ_Rx using known in the art techniques.

The data signals recovered in the Rx signal path 30 may however be somewhat distorted relative to those initially generated in the Tx signal path; examples of the distortions include pulse shape distortions due to bandwidth limitations in the signal path, power imbalance between channels, and timing skew between channels. At least some of these and other distortions may originate in the Tx and/or Rx signal paths of communicating transceivers, and the ability to identify contributions of the Tx and Rx signal path to the distortion would facilitate transceiver calibration and optimization.

When PIC 390 operates in the loopback mode, in the absence of the optical channel mixer 380, the electrical Tx signals XI_Tx, XQ_Tx, YI_Tx, YQ_Tx could be mapped one-to-one to the electrical Rx signals XI_Rx, XQ_Rx, YI_Rx, and YQ_Rx at the output of the PD circuit 338. This one-to-one mapping of the electrical Tx signals to the electrical Rx signals could complicate or make impossible separating signal impairments in the Rx signal path 30 of the host transceiver 300 from those in the Tx signal path 20 of the transceiver, and also complicate or make impossible characterizing aspects of the transmitter signal recovery process in the data sink 36 of the digital signal processor 350 of the host transceiver.

Advantageously, in the presence of the optical channel mixer 380 in LOC 340 and the LO-signal "dephasing" action of the optical phase shifter 335, in the loopback mode of operation each of the electrical Rx signals 373 XI_Rx, XQ_Rx, YI_Rx, and YQ_Rx comprises some combination of two or more of the electrical Tx signals 371 XI_Tx, XQ_Tx, YI_Tx, YQ_Tx generated by the data source 26 of the digital signal processor 350 of the host transceiver 300. This mixing of the Tx signal channels enables separating signal impairments in the Rx signal path of the transceiver from those in the Tx signal path 20 of the transceiver, and their separate characterization and tuning.

Figure 9:
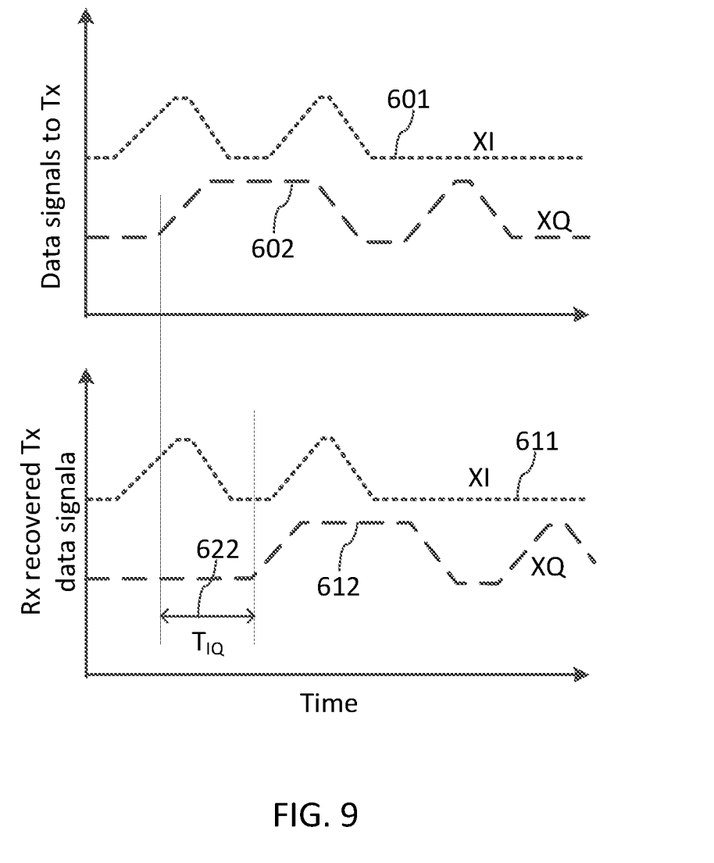
FIG. 9 is a schematic graphical representation of the IQ timing skew in a transmitter-receiver signal path.

FIG. 9 schematically illustrates, by way of example, a transformation of data signals in the XI and XQ channels from the time they are generated by a data source of a signal processor of a transceiver to the time they are recovered by a data sink of a signal processor of a same or different transceiver. The top panel of FIG. 9 illustrates example electrical Tx signals XI 601 and XQ 602 which may be generated by the data source of a transmitting transceiver. The lower panel of FIG. 6 illustrates corresponding digital signals 611 (XI) and 612 (XQ) as may be recovered by the data sink of a receiving transceiver. One transmission quality parameter is a relative timing skew, i.e. a time delay, between the transmission channels XI, XQ, YI, and YQ. It is typically desired that a timing skew between these four transmission channels is sufficiently small, generally the smaller the better. FIG. 9 illustrates by way of example a timing skew $T_{IQ}$ 622 between the XI and XQ transmission channels, and may be referred to as the IQ timing skew. A relative time delay between, for example the XI and YI signals may be referred to as the polarization timing skew, or the XY timing skew. Generally, non-idealities in both the Tx signal path and the Rx signal path may contribute in the timing skew. An approach to transceiver testing that is able to separate the Tx and Rx contributions to the timing skews and other transmission distortions is desirable for transceiver optimization and characterization.

In some embodiments the transceiver 300 may be configured to be switched between a loopback mode and a regular operation mode as described above. When operating in the loopback mode, the data source 26 of processor 350 of the host transceiver 300 may be configured to provide one or more electrical Tx signals 371 to the optical Tx circuit 320 of the host transceiver 300, and the data sink 36 may be configured to recover the Tx signals 371 from the electrical Rx signal 373, as it would during the regular operation of the host transceiver 300. From here, LTL 46 provided in processor 350, or another instrument, may be engaged to determine one or more transmission quality parameters, for example by comparing the electrical Tx signals 371 to the recovered Tx signals that are recovered by the data sink from the electrical Rx signals 373.

For example, LTL 46 may be configured to detect a signal distortion parameter, such as for example one of the IQ skew and the XY skew accrued in the Tx and Rx signal paths combined. The Tx-path skew and the Rx-path skew of the host transceiver 300 may then be estimated separately, for example by separately varying skew compensation parameters in the Tx signal path and the Rx signal path. A transmission quality measure, such as for example the bit error ratio (BER), the Q-factor as a measure of the eye opening, the error vector magnitude (EVM), or any other suitable transmission quality measure, may be used to optimize the distortion parameter being measured. In some embodiments, the Tx-side and the Rx-side skews and other distortion parameters may be estimated by generating orthogonal frequency combs in the electrical transmit channels and analyzing the phase and amplitude of the mixed input into the receiver. Here the term "orthogonal frequency combs" refers to a frequency comb in which no frequency is a harmonic of any other frequency in the comb.

Other transmission parameters of the optical transceiver that may also be measured in the loopback mode include an electro-optic (EO) S21 parameter of a Tx and/or Rx signal path. The EO S21 parameter of the Tx signal path characterizes the combined electro-optic frequency response of the data source 26, the amplification circuitry of the Tx signal path, and the electro-optic converter stage 120, 220, or 320. The OE S21 parameter of the Rx signal path characterizes the combined electro-optic frequency response of the OE converter of the optical Rx circuit 130, 230, 330, the analog amplification circuitry of the Rx signal path, and the data sink 36. By comparing the electrical Rx signals 373 XI_Rx, XQ_Rx, YI_Rx, and YQ_Rx to the electrical Tx signals 371 XI_Tx, XQ_Tx, YI_Tx, YQ_Tx, the EO S21 parameters for the Rx signal path and the Tx signal path can be separately estimated. In some embodiments S21 parameter information, such as its frequency dependence, may be extracted from saved electrical signal traces, and may then be used for example to optimize Tx signal pre-emphasis.

Although the description hereinabove with reference to FIGS. 5-9 was focused primarily on PICs configured to transmit and receive quadrature modulated light signals, in other embodiments PIC 390 and the transceiver 300 may be configured to operate with other modulation formats, such as for example PAM-4, PAM-8, 4-ASK, and the like. In such embodiments each of the optical modulators 320X and 320Y may be for example in the form of a single MZM driven by multi-level electrical PAM signals, or a nested MZM, each driven by a binary signal. The dual optical Rx circuit 330 may remain substantially the same, with a suitably modified PD circuit 338 as would be evident to a skilled reader.

Accordingly, an aspect of the present disclosure provides a method for characterizing an optoelectronic transceiver (e.g. 100, 300) comprising a PIC (e.g. 90, 190, 290, 390), the PIC comprising an optical receiver (Rx) circuit and an optical transmitter (Tx) circuit, the method comprising: switchably directing, within the PIC, a loopback optical signal from an output port of the optical Tx to an input port of the optical Rx; and, processing one or more electrical signals obtained from an output of the optical Rx to estimate one or more characteristics of the optoelectronic transceiver.

In some implementations of the method the loopback optical signal comprises a first optical channel (e.g. I and/or X) and a second optical channel (e.g. Q and/or Y), and the method comprises mixing the first and second optical channels within the PIC using an integrated optical mixer (e.g. 280, 380) and/or an LO phase tuner (e.g. 135, 335).

In some implementations wherein the optical Rx circuit is configured to coherently mix the loopback optical signal with local oscillator (LO) light, the method comprises tuning an optical phase of the LO light in the loopback mode of PIC operation.

In some implementations, wherein the optical Tx circuit (e.g. 220, 320) comprises a quadrature optical modulator (e.g. 320X, 320Y), the method may further comprise: providing the loopback optical signal comprising an in-phase (I) optical signal and a quadrature-phase (Q) optical signal responsive to an I-channel electrical Tx signal (e.g. XI_Tx or YI_Tx) and a Q-channel electrical Tx signal (e.g. XQ_Tx or YQ_Tx); obtaining, using the optical Rx circuit, an I-channel electrical Rx signal (e.g. XI_Rx or YI_Rx) and a Q-channel electrical Rx signal (e.g. XQ_Rx or YQ_Rx) responsive to the loopback optical signal; and, comparing the I-channel and Q-channel electrical Tx signals and the I-channel and Q-channel electrical Rx signals to estimate at least one of: an IQ skew of an Rx signal path of the optoelectronic transceiver, an IQ skew of a Tx signal path of the optoelectronic transceiver, an electro-optic (EO) S21 parameter of the Tx signal path of the optoelectronic transceiver, or an OE S21 parameter of the Rx signal path of the optoelectronic transceiver.

In some implementations wherein the optical Tx circuit (e.g. 320) is configured to output a polarization multiplexed optical signal responsive to an X-channel electrical Tx signal (e.g. XI_Tx and/or XQ_Tx) and a Y-channel electrical Tx signal (e.g. YI_Tx and/or YQ_Tx), the method may further comprise: providing the loopback optical signal (e.g. 341x) comprising an X-channel optical signal responsive to the X-channel electrical Tx signal and a Y-channel optical signal (e.g. 341y) responsive to the Y-channel electrical Tx signal; mixing the X-channel optical signal and the Y-channel optical signal to provide two mixed optical signals (e.g. 345, 343) to the optical Rx circuit (e.g. 330); obtaining, using the optical Rx circuit, an X-channel electrical Rx signal (e.g. XI_Rx and/or XQ_Rx) and a Y-channel electrical Rx signals (e.g. YI_Rx and/or YQ_Rx); and, comparing the X-channel and Y-channel electrical Tx signals and the X-channel and Y-channel electrical Rx signals to separately estimate at least one of: an XY or IQ skew of an Rx signal path of the optoelectronic transceiver, an XY or IQ skew of a Tx signal path of the optoelectronic transceiver, an EO S21 parameter of the Tx signal path of the optoelectronic transceiver, or an OE S21 parameter of the Rx signal path of the optoelectronic transceiver.

A further aspect of the present disclosure provides a PIC for an optical transceiver, the PIC comprising: an input PIC port for receiving an input optical signal; an output PIC port for transmitting an output optical signal; an optical receiver (Rx) circuit optically coupled to the input PIC port and configured to process the input optical signal for conversion into one or more electrical Rx signals; an optical transmitter (Tx) circuit optically coupled to the output PIC port, the optical Tx circuit configured to provide the output optical signal and a loopback optical signal responsive to one or more electrical Tx signals; and, a loopback optical circuit (LOC) configured to switchably couple the loopback optical signal into the optical Rx circuit for testing and/or tuning one or more parameters of the optical transceiver.

In some implementations the loopback optical circuit, the optical Rx circuit, and the optical Tx circuit may be implemented in a same optical chip.

In some implementations the loopback optical circuit may comprise a switching circuit configured to switchably block the optical Rx circuit from receiving the loopback optical signal. In some implementations the switching circuit may be configured to switchably block an optical connection between the optical Rx circuit and the input PIC port when the loopback optical signal is coupled into the optical Rx circuit. In some implementations the switching circuit may be configured to switchably block an optical connection between the optical Tx circuit and the output PIC port when the loopback optical signal is coupled into the optical Rx circuit.

In some implementations the loopback optical signal may comprise a first optical channel and a second optical channel, and the loopback optical circuit may comprise a loopback optical mixer configured to mix the first optical channel and the second optical channel. In some implementations the output PIC port comprises a polarization combiner for combining the first and second optical channels in orthogonal polarizations.

In some implementations the optical Tx circuit comprises an optical modulator circuit (OMC) (e.g. 320 in FIG. 5) comprising an input optical port (e.g. 312), and the optical Rx circuit (e.g. 330) comprises a first Rx optical mixer (e.g. 330X). The first Rx optical mixer may comprise one or more signal ports (e.g. 331, 333) switchably coupled to the input PIC port (e.g. 362) and the loopback optical circuit (e.g. 340), and a local oscillator (LO) port (e.g. 332). The PIC may further comprise a light source port for receiving input light from a light source, the light source port coupled to the input optical port of the OMC and the LO port of the first optical mixer.

In some implementations the PIC (e.g. 190, 390) may further comprise a phase tuner (e.g. 135, 335) disposed in an optical path from the light source port (e.g. 115, 303) to the LO port of the first optical mixer and configured to tune an optical phase of the input light received in the LO port.

In some implementations the first Rx optical mixer comprises a first optical hybrid (OH) having the LO port coupled to the light source port; the one or more signal ports of the first Rx optical mixer may comprise a first signal port optically coupled to the input PIC port and a second signal port optically coupled to the loopback optical circuit.

In some implementations the OMC (e.g. 320 in FIG. 5) may comprise a first optical modulator (e.g. 320X) configured to output a first optical channel and a second optical modulator (e.g. 320Y) configured to output a second optical channel; the LOC (e.g. 340) may comprise a loopback optical mixer (e.g. 380) configured to mix the first optical channel and the second optical channel and to output a first mixed optical signal and a second mixed optical signal; the one or more signal ports of the first Rx optical mixer may be optically coupled to the loopback optical mixer for receiving the first mixed optical signal. The optical Rx circuit may further comprise a second Rx optical mixer, the second Rx optical mixer comprising: an LO port coupled to the light source port, and one or more signal ports optically coupled to the loopback optical mixer for receiving the second mixed optical channel and to the input PIC port. In some implementations each of the first optical mixer and the second optical mixer may comprise a 90° optical hybrid (OH), and the one or more signal ports of each of the first optical mixer and the second optical mixer may comprise a first signal port coupled to the input PIC port and a second signal port coupled to the loopback optical mixer.

In some implementations the optical Tx circuit may comprise a first output optical coupler (e.g. 407 in FIG. 6) having a first output coupler port optically coupled to the output PIC port and a second output coupler port optically coupled to the loopback optical circuit.

In some implementations the switching circuit may be configured to switchably couple the output optical signal from the optical Tx circuit to either the optical PIC port or to the optical Rx circuit as the loopback optical signal. In some implementations the switching circuit may comprise one or more optical shutters.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings.

For example, it will be appreciated that different dielectric materials and semiconductor materials including but not limited to silicon (Si), Silicon on Insulator (SOI), and compound semiconductor materials of groups commonly referred to as A3B5 and A2B4, such as GaAs, InP, and their alloys and compounds may be used to fabricate elements of the optical transceiver example embodiments of which are described hereinabove. Furthermore in some embodiments the optical Tx circuit may be embodied using integrated devices other than MZMs, including but not limited to other types of optical modulators, such as for example optical phase modulators or optical modulators based on micro-ring or micro-disk resonators, or as directly modulated lasers. In embodiments where the data source, e.g. 26, provides more than one channel, those channels could serve as source for modulated optical signals exploiting polarization multiplexing, quadrature modulation, or multi-level amplitude modulation (e.g. PAM-4, PAM-8, 4-ASK, and the like). Principles described above can be exploited for both single-optical-channel transceivers and WDM transceivers.

Furthermore, elements or features described hereinabove with reference to a particular example embodiment may also be incorporated in other described embodiments or their variants. Furthermore, some of the elements described hereinabove with reference to one or more embodiments may be omitted or replaced with another elements capable of similar functions, and another elements added.

Furthermore in the description above, for purposes of explanation and not limitation, specific details are set forth such as particular architectures, interfaces, techniques, etc. in order to provide a thorough understanding of the present disclosure. In some instances, detailed descriptions of well-known devices, circuits, and methods are omitted so as not to obscure the description with unnecessary detail. Thus, for example, it will be appreciated by those skilled in the art that block diagrams herein can represent conceptual views of illustrative circuitry embodying the principles of the technology. Furthermore, it will be appreciated that each of the example embodiments described hereinabove may include features described with reference to other example embodiments.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. A photonic integrated circuit (PIC) for an optical transceiver, the PIC comprising:
    an input PIC port for receiving an input optical signal;
    an output PIC port for transmitting an output optical signal;
    an optical receiver (Rx) circuit optically coupled to the input PIC port and configured to process the input optical signal for conversion into one or more electrical Rx signals;
    an optical transmitter (Tx) circuit optically coupled to the output PIC port, the optical Tx circuit configured to provide the output optical signal and a loopback optical signal responsive to one or more electrical Tx signals; and,
    a loopback optical circuit (LOC) configured to switchably couple the loopback optical signal into the optical Rx circuit for testing the optical transceiver;
    wherein the loopback optical signal comprises a first optical channel and a second optical channel, and wherein the loopback optical circuit comprises a loopback optical mixer configured to mix the first optical channel and the second optical channel.

2. The PIC of claim 1 wherein the loopback optical circuit, the optical Rx circuit, and the optical Tx circuit are implemented in a same optical chip.

3. The PIC of claim 2 wherein the loopback optical circuit comprises a switching circuit configured to switchably block the optical Rx circuit from receiving the loopback optical signal.

4. The PIC of claim 3 wherein the switching circuit is further configured to switchably block an optical connection between the optical Rx circuit and the input PIC port when the loopback optical signal is coupled into the optical Rx circuit.

5. The PIC of claim 3 wherein the switching circuit is further configured to switchably block an optical connection between the optical Tx circuit and the output PIC port when the loopback optical signal is coupled into the optical Rx circuit.

6. The PIC of claim 3 wherein the switching circuit is configured to switchably couple the output optical signal from the optical Tx circuit to either the optical PIC port or to the optical Rx circuit as the loopback optical signal.

7. The PIC of claim 3 wherein the switching circuit comprises one or more optical shutters.

8. The PIC of claim 1 wherein the output optical signal comprises the first optical channel and the second optical channel, and wherein the output PIC port comprises a polarization combiner for polarization multiplexing the first and second optical channels.

9. A photonic integrated circuit (PIC) for an optical transceiver, the PIC comprising:
    an input PIC port for receiving an input optical signal;
    an output PIC port for transmitting an output optical signal;
    an optical receiver (Rx) circuit optically coupled to the input PIC port and configured to process the input optical signal for conversion into one or more electrical Rx signals;
    an optical transmitter (Tx) circuit optically coupled to the output PIC port, the optical Tx circuit configured to provide the output optical signal and a loopback optical signal responsive to one or more electrical Tx signals; and,
    a loopback optical circuit (LOC) configured to switchably couple the loopback optical signal into the optical Rx circuit for testing the optical transceiver;
    wherein:
    the optical Tx circuit comprises an optical modulator circuit (OMC) comprising an input optical port,
    the optical Rx circuit comprises a first Rx optical mixer, the first Rx optical mixer comprising:
        one or more signal ports switchably coupled to the input PIC port and the loopback optical circuit, and
        a local oscillator (LO) port; and,
    the PIC further comprises a light source port for receiving input light from a light source, the light source port coupled to the input optical port of the OMC and the LO port of the first Rx optical mixer.

10. The PIC of claim 9 further comprising a phase tuner disposed in an optical path from the light source port to the LO port of the first Rx optical mixer and configured to tune an optical phase of the input light received in the LO port.

11. The PIC of claim 9 wherein the first Rx optical mixer comprises a first optical hybrid (OH), and wherein the one or more signal ports of the first Rx optical mixer comprises a first signal port optically coupled to the input PIC port and a second signal port optically coupled to the loopback optical circuit.

12. The PIC of claim 9 wherein:
the OMC comprises a first optical modulator configured to output a first optical channel and a second optical modulator configured to output a second optical channel;
the loopback optical circuit (LOC) comprises a loopback optical mixer configured to mix the first optical channel and the second optical channel and to output a first mixed optical signal and a second mixed optical signal;
the one or more signal ports of the first Rx optical mixer is optically coupled to the loopback optical mixer for receiving the first mixed optical signal; and
the optical Rx circuit further comprises a second Rx optical mixer, the second Rx optical mixer comprising:
an LO port coupled to the light source port, and
one or more signal ports optically coupled to at least one of: the loopback optical mixer for receiving the second mixed optical channel, and to the input PIC port for receiving the input optical signal.

13. The PIC of claim 12 wherein each of the first Rx optical mixer and the second optical mixer comprises a 90° optical hybrid (OH), and wherein the one or more signal ports of each of the first Rx optical mixer and the second optical mixer comprises a first signal port coupled to the input PIC port and a second signal port coupled to the loopback optical mixer.

14. The PIC of claim 1 wherein the optical Tx circuit comprises a first output optical coupler having a first output coupler port optically coupled to the output PIC port and a second output coupler port optically coupled to the loopback optical circuit.

15. A method for characterizing an optoelectronic transceiver comprising a photonic integrated circuit (PIC), the PIC comprising an optical receiver (Rx) circuit and an optical transmitter (Tx) circuit, the method comprising:
switchably directing, within the PIC, a loopback optical signal from an output port of the optical Tx circuit to an input of the optical Rx circuit in a loopback mode of PIC operation; and,
processing one or more electrical signals obtained from an output of the optical Rx circuit in the loopback mode of PIC operation to estimate one or more characteristics of the optoelectronic transceiver;
wherein the loopback optical signal comprises a first optical channel and a second optical channel, and
wherein the method comprises mixing the first and second optical channels within the PIC.

16. The method of claim 15 wherein the optical Rx circuit is configured to coherently mix the loopback optical signal with local oscillator (LO) light, the method comprising tuning an optical phase of the LO light in the loopback mode of PIC operation.

17. The method of claim 16 comprising:
providing the loopback optical signal comprising an in-phase (I) optical signal and a quadrature-phase (Q) optical signal responsive to an I-channel electrical Tx signal and a Q-channel electrical Tx signal;
obtaining, using the optical Rx circuit, an I-channel electrical Rx signal and a Q-channel electrical Rx signal responsive to the loopback optical signal; and,
comparing the I-channel and Q-channel electrical Tx signals and the I-channel and Q-channel electrical Rx signals to estimate at least one of:
an IQ skew of an Rx signal path of the optoelectronic transceiver,
an IQ skew of a Tx signal path of the optoelectronic transceiver,
an electro-optic (EO) S21 parameter of the Tx signal path of the optoelectronic transceiver, or
an OE S21 parameter of the Rx signal path of the optoelectronic transceiver.

18. The method of claim 15 wherein the optical Tx circuit is configured to output a polarization multiplexed optical signal responsive to an X-channel electrical Tx signal and a Y-channel electrical Tx signal, the method comprising:
providing the loopback optical signal comprising an X-channel optical signal responsive to the X-channel electrical Tx signal and a Y-channel optical signal responsive to the Y-channel electrical Tx signal;
mixing the X-channel optical signal and the Y-channel optical signal to provide two mixed optical signals to the optical Rx circuit;
obtaining, using the optical Rx circuit, an X-channel electrical Rx signal and a Y-channel electrical Rx signal; and,
comparing the X-channel and Y-channel electrical Tx signals and the X-channel and Y-channel electrical Rx signals to estimate at least one of:
an XY skew of an Rx signal path of the optoelectronic transceiver,
an XY skew of a Tx signal path of the optoelectronic transceiver,
an electro-optic (EO) S21 parameter of the Tx signal path of the optoelectronic transceiver, or
an OE S21 parameter of the Rx signal path of the optoelectronic transceiver.

* * * * *